United States Patent [19]
Pifferi

[11] 3,723,502
[45] Mar. 27, 1973

[54] CARBAMIC ACID DERIVATIVES
[75] Inventor: Giorgio Pifferi, Milan, Italy
[73] Assignee: Grupp Leptit S.p.A., Milan, Italy
[22] Filed: Oct. 29, 1969
[21] Appl. No.: 872,372

[30]  Foreign Application Priority Data

Oct. 29, 1968  Italy .......................23092 A/68

[52] U.S. Cl...............................260/471 C, 424/300
[51] Int. Cl..............................................C07c 125/06
[58] Field of Search..................................260/471 C

[56]  References Cited

UNITED STATES PATENTS 2,800,498  7/1957  Chabrier et al....................260/471 C

OTHER PUBLICATIONS

Haekmon, M. et al. Chemical Abstracts, Vol. 65 (1966), page 3792B.

Primary Examiner—Lorraine A. Weinberger
Assistant Examiner—L. Arnold Thaxton
Attorney—Joseph Hirschmann

[57]  ABSTRACT

New derivatives of carbamic acid esters are referred to, having an anticonvulsant activity. There is also provided a method for preparing them, starting from a benzylamine and a carbonic acid derivative.

4 Claims, No Drawings

CARBAMIC ACID DERIVATIVES

The invention is concerned with a new class of compounds and, more particularly with the carbamic acid esters carrying a substituent group linked to the nitrogen atom. They are represented by the following formula:

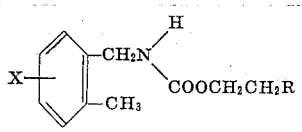

wherein R is a member of the class consisting of hydrogen and hydroxy and X represents a halogen atom.

It is a further object of the present invention to provide a method for preparing the compounds described.

The synthesis starts from a benzylamine of the formula

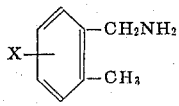

wherein X has the above significance, which is contacted with a derivative of the carbonic acid selected from 1,3-dioxolan-2-one and ethyl chlorocarbonate.

Though the reaction takes place with satisfactory yields also when equimolecular amounts of the two reactants are used, it is however preferable to employ a slight excess of the second, i.e., the carbonic acid derivative, in respect of the benzylamine. Moreover the reaction can be carried out both in the presence and in the absence of a solvent, dependently on the nature of the reactants, in the second case one of the reactants acting as a solvent. The anticonvulsant activity was ascertained by administering some representative compounds intraperitoneally to mice, in comparison with meprobamate, and determining the dose effective in protecting the animals from electroshock induced tonic convulsions. The results are summarized in the following table.

| Compound of Example | Dose mg/Kg | Protected/Treated Animals | LD 50 |
|---|---|---|---|
| 1 | 15 | 1/5 | 600 |
|  | 25 | 3/5 |  |
|  | 35 | 5/5 |  |
| 2 | 15 | 0/5 | 620 |
|  | 25 | 2/5 |  |
|  | 35 | 5/5 |  |
| 3 | 15 | 0/5 | 750 |
|  | 25 | 2/5 |  |
|  | 35 | 5/5 |  |
| 4 | 15 | 0/5 | 650 |
|  | 25 | 1/5 |  |
|  | 35 | 4/5 |  |
| Meprobamate | 50 | 1/5 | 555 |
|  | 75 | 2/5 |  |
|  | 100 | 5/5 |  |

Also in the righting reflex test the four compounds above listed were active in abolishing said reflex in rats at doses ranging between 50 and 70 mg/Kg. as compared with 120 mg/Kg for meprobamate. In the avoidance behavior test the activity was for all new compounds about twice the activity of meprobamate (45–50 mg/Kg against 80–90 mg/Kg).

EXAMPLE 1

2-Hydroxyethyl (4-chloro-2-methylbenzyl)-carbamate a. To 2 g. (2.85 mmole) of 4-chloro-methylbenzylamine 1.03 g. (12.85 mmole) of 1,3-dioxolan-2-one are added and the mixture is stirred at 40°–50° C for 8 hours. After standing one night at the same temperature, the formed crystals are collected by filtration and recrystallized from isopropyl ether. An amount of 2.52 (81.1 percent) g. of 2-hydroxyethyl (4-chloro-2-methylbenzyl)-carbamate is obtained. M.p. 106°–107° C.

Analysis

Calculated for $C_{11}H_{14}ClNO_5$ C 54.20; H 5.79 N 5.78; Cl 14.55

Found C 54.39; H 5.85 N 5.70; Cl 14.57 b. The starting 4-chloro-2-methylbenzylamine is prepared as follows. To a solution of 41 g. of lithium-aluminum hydride in 350 ml. of anhydrous diethyl ether, previously cooled at 0°C, 25 g. of 4-chloro-2-methylbenzonitrile in 1000 ml. of anhydrous diethyl ether are added during 30 minutes. After standing an hour at room temperature, the mixture is refluxed for two hours, allowed to cool and then 90 ml. of water are added. After stirring for half an hour the reaction liquid is filtered from the precipitated salts, washed with a 10 percent sodium chloride solution and made anhydrous over sodium sulphate. Finally the solvent is removed and the residue distilled in vacuo, to give 22.5 g. (87.7 percent) of 4-chloro-2-methylbenzyl amine. B.p. 75° C/0.03 mm Hg.

Analysis

Calculated for $C_8H_{10}ClN$ C 61.73; H 6.48 N 9.00; Cl 22.79

Found C 61.14; H 6.53 N 8.83; Cl 23.06

EXAMPLE 2

2-Hydroxyethyl (5-chloro-2-methylbenzyl)-carbamate a. In a round-bottom flask 4.5 g. (29mmole) of 5-chloro-2-methylbenzylamine and 2.32 g. (26.4 mmole) of 1,3-dioxolan-2-one are stirred for 8 hours at 45° C. The mixture is allowed to stand one night at the same temperature. The formed crystals are collected by filtering; washed with a few ml. of cold isopropyl ether, and recrystallized from the same solvent.

Yield 6.1 g. (88.6%) of 2-hydroxyethyl (5-chloro-2-methylbenzyl)-carbamate.

Analysis

Calculated for $C_{11}H_{14}ClNO_3$ C 54.20; H 5.79 N 5.75; Cl 14.55

Found C 54.07; H 5.85 N 5.64; Cl 14.60 b. The starting 5-chloro-2-methylbenzylamine is prepared as follows.

To a solution of 42 g. of lithium aluminum hydride in 380 ml. of diethyl ether, cooled at 0° C, 25.1 g. of 5-chloro-2-methylbenzonitrile dissolved in 1050 ml. of diethyl ether are slowly added during 30 minutes.

The temperature is allowed to rise to room temperature during an hour, then the liquid is refluxed for 2 hours. The mixture is cooled at 0° C and 110 ml. of water are added to decompose the excess of lithium aluminum hydride. The mixture is filtered and the filtrate is washed with a 10 percent sodium chloride solution, then made anhydrous over sodium sulphate. The solvent is distilled off and the oily residue obtained is distilled in vacuo, giving 23.5 g. (91.2%) of 5-chloro-2-methylbenzylamine. B.p. 80° C/0.01 mm. Hg.

Analysis

Calculated for $C_8H_{10}ClN$ C 61.73; H 6.48; N 9.00
Found C 61.34; H 6.60; N 9.20

EXAMPLE 3

Ethyl (4-chloro-2-methylbenzyl)-carbamate

In a vessel containing 2 g. (12.85 mmole) of 4-chloro-2-methyl-benzylamine, prepared as described in example 1, 20 ml. of water and 5 ml. of benzene, a solution of 1.365 g. (14.15 mmole) of ethyl chlorocarbonate in 5 ml. of benzene and a second solution of g. 1.5 (14.15 mmole) of sodium bicarbonate in 5 ml. of water are simultaneously added during 20 minutes. The mixture is stirred 1 hour at room temperature, then the aqueous layer is separated and extracted twice with benzene. The combined benzene extracts are washed with water to neutrality and made anhydrous over sodium sulphate. The solvent is then removed in vacuo and the residue recrystallized from petroleum ether, and 2.85 g. (88.0%) of ethyl (4-chloro-2-methylbenzyl)-carbamate are obtained. M.p. 64°–65° C.

Analysis

Calculated for $C_{11}H_{14}ClNO_2$ C 58.05; H 6.20 N 6.15; Cl 15.58
Found C 56.90; H 6.28 N 6.08; Cl 15.31

EXAMPLE 4

Ethyl (5-chloro-2-methylbenzyl)-carbamate

To a mixture of 8 g. (51.4 mmole) of 5-chloro-2-methylbenzylamine, prepared as described in example 2, 70 ml. of water and 25 ml. of benzene, two solutions respectively of 5.48 g. (57.8 mmole) of ethyl chlorocarbonate in 25 ml. of benzene and 6.01 g. (57.8 mmole) of sodium bicarbonate in 25 ml. of water are simultaneously added during 20 minutes. The mixture is stirred for an hour at room temperature, then the organic layer is separated from the aqueous one. The latter is extracted twice with benzene and the combined benzene extracts are washed to neutrality with water and made anhydrous over sodium sulphate. The solvent is distilled in vacuo and the residue is recrystallized from 70 ml. of hexane, giving 10 g. (85.4 percent) of ethyl (5-chloro-2-methylbenzyl)-carbamate. M.p. 52°–53 C.

Analysis

Calculated for $C_{11}H_{14}ClNO_2$ C 58.05; H 6.20 N 6.15; Cl 15.58
Found C 58.13; H 6.35 N 6.29; Cl 15.70

I claim:

1. A carbamic acid derivative of the formula

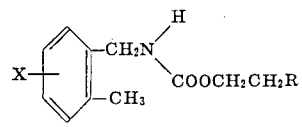

wherein R is a member of the class consisting of hydrogen and hydroxy and X represents chlorine.

2. A compound as in claim 1, wherein the carbamic acid derivative is 2-hydroxyethyl (4-chloro-2-methylbenzyl)-carbamate.

3. A compound as in claim 1, wherein the carbamic acid derivative is 2-hydroxyethyl (5-chloro-2-methylbenzyl)-carbamate.

4. A compound as in claim 1, wherein the carbamic acid is ethyl (5-chloro-2-methylbenzyl)-carbamate.

* * * * *